(12) United States Patent
Kim

(10) Patent No.: US 7,274,983 B1
(45) Date of Patent: Sep. 25, 2007

(54) SHIFT CONTROL METHOD AND APPARATUS OF AUTOMATIC TRANSMISSION OF VEHICLE

(75) Inventor: Hoegab Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/647,717

(22) Filed: Dec. 28, 2006

(30) Foreign Application Priority Data

Aug. 17, 2006 (KR) .................. 10-2006-0077875

(51) Int. Cl.
  *G06F 7/00* (2006.01)
(52) U.S. Cl. .................. 701/55; 701/56; 701/66
(58) Field of Classification Search .......... 701/55, 701/56, 51, 65, 64, 62, 66; 192/3.51, 3.58; 475/269, 288, 284; 477/143, 144, 156
See application file for complete search history.

(56) References Cited

U.S. PATENT DOCUMENTS

| 5,743,826 | A  | * | 4/1998 | Usuki et al. ............... 477/98 |
| 6,949,050 | B2 | * | 9/2005 | Takatori et al. ........... 477/156 |
| 6,997,843 | B2 | * | 2/2006 | Saitou ...................... 475/269 |

* cited by examiner

*Primary Examiner*—Richard M. Camby
(74) *Attorney, Agent, or Firm*—Peter F. Corless; Edwards Angell Palmer & Dodge LLP (57) ABSTRACT

When a sport mode shifting request occurs during gear shifting of an automatic transmission according to a vehicle running state, a transmission control unit determines whether or not to accept the sport mode shifting request on the basis of an expected turbine speed at a target speed of currently controlled upshift and an expected turbine speed at a final target speed requested by the sport mode shifting request. By such a scheme, shift shock is reduced and responsiveness is enhanced.

20 Claims, 5 Drawing Sheets

[A] : Allow sport mode up-shifting
[B] : Prohibit sport mode up-shifting
[C] : Start requested sport mode up-shifting after an end of current up-shifting

[A] : Allow sport mode down-shifting
[B] : Prohibit sport mode down-shifting
[C] : Start requested sport mode down-shifting after an end of current down-shifting

FIG.5

SHIFT CONTROL METHOD AND APPARATUS OF AUTOMATIC TRANSMISSION OF VEHICLE

CROSS-REFERENCE TO RELATED APPLICATION

This application claims priority to and the benefit of Korean Patent Application No. 10-2006-0077875 filed in the Korean Intellectual Property Office on Aug. 17, 2006, the entire contents of which are incorporated herein by reference.

BACKGROUND OF THE INVENTION (a) Field of the Invention

The present invention relates to an automatic transmission. More particularly, the present invention relates to a shift control method that allows a sport mode shifting request to be performed on the basis of vehicle operation parameters.

(b) Background

Typically, an automatic transmission automatically controls its shifting operation. For such an automatic shifting control, a shift control apparatus controls hydraulic pressure of a plurality of solenoid valves depending on various vehicle operation conditions including vehicle speed and throttle valve opening.

The automatic transmission includes a number of frictional elements. For shifting operation, an off-going element is released from its operation and an on-coming element is newly operated. The operation of the off-going and on-coming elements is conducted through control of hydraulic pressure supplied thereto.

Recently, an automatic transmission is provided with a sport mode. Such transmission can operate just as the common type of automatic transmission, but it also allows the driver to override the automatic mode by moving a shift lever and feel dynamic gear shifting.

More particularly, sport mode can be selected by moving a shift lever to a manual gate (or called a sport mode gate) that is usually arranged to the right of D range position. Such a sport mode gate is typically formed with "+" and "−" positions and a neutral position therebetween, and a shift request is generated by moving the shift lever to the "+" or "−" position. Once moved to the "+" or "−" position, the shift lever can easily return to its neutral position by a returning device installed in the shift lever assembly.

Typically, a downshift request is generated when the shift lever is moved to the "−" position, and such a downshift request in a sport mode is hereinafter called a sport mode down-shifting request. Also, an upshift request is generated when the shift lever is moved to the "+" position, and such an upshift request in a sport mode is hereinafter called a sport mode up-shifting request.

Appropriate operation of the shift lever allows skip shifting. For example, if the shift lever is repeatedly operated twice, the skip shifting such as 5→3 or 2→4 shifting is enabled.

Sport mode provides a better responsiveness than manual transmission, owing to the shortened shifting period and continuous transmission of engine power.

Normally, sport mode does not involve so-called hold function since the shifting is virtually equivalent to manual shifting by the shift lever. Also, engine braking effect can be fully utilized in sport mode.

In an automatic transmission provided with sport mode, an upshift or downshift can be requested by operation of the shift lever while upshift or downshift according to a vehicle driving condition such as vehicle speed and throttle valve opening is under operation.

In the case that a sport mode up-shifting request is detected during upshift, acceleration responsiveness may be deteriorated if shifting to the target shift-speed requested in the sport mode is delayed.

Also, in the case that a sport mode down-shifting request is detected during downshifting, engine braking effect may abruptly increase such that a shift-shock may be felt by a driver.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a shift control method and apparatus having advantages of enhanced responsiveness and reduced shift shock In one aspect, the present invention provides a shift control apparatus of an automatic transmission, which comprises: a sensor unit that detects data for shift control of the automatic transmission; an actuating unit for actuating shifting of the automatic transmission; and a transmission control unit that controls the shifting of the automatic transmission by controlling the actuating unit based on the data from the sensor unit, wherein the transmission control unit executes a set of instructions comprising instructions for a shift control method hereinafter described.

In another aspect, the present invention provides a shift control method of an automatic transmission, In a preferred embodiment, the shift control method comprises: determining whether a sport mode up-shifting request is detected; determining, when the sport mode up-shifting request is detected, whether up-shifting according to a vehicle running condition is under operation; retrieving, when the up-shifting is under operation, an initial turbine speed at the time of starting the up-shifting according to the vehicle running state; calculating a first expected turbine speed that is a turbine speed at a shift-finish point of the up-shifting according to the vehicle running state; calculating a second expected turbine speed that is a turbine speed at a shift-finish point of the up-shifting requested by the sport mode up-shifting request; determining if a speed difference between the first and second expected turbine speeds is greater than or equal to a predetermined shift prohibition reference value; and prohibiting the requested sport mode up-shifting if the speed difference is greater than or equal to the predetermined shift prohibition reference value.

Preferably, such shift control method may further include, when the up-shifting according to the driving condition is not under operation, controlling up-shifting to a final target speed requested by the sport mode up-shifting request.

Also preferably, the shift control method may further include, when a sport mode up-shifting request is detected while down-shifting according to the driving condition is under operation, controlling up-shifting to a final target speed requested by the sport mode up-shifting request.

The shift control method may also further include, when the speed difference is less than the predetermined shift prohibition reference value, controlling up-shifting to a final target speed requested by the sport mode up-shifting request.

In another preferred embodiment, shift control method of the present invention comprises: determining whether a sport mode down-shifting request is detected; determining, when the sport mode down-shifting request is detected, whether down-shifting according to a vehicle running condition is under operation; retrieving, when the down-shifting is under operation, an initial turbine speed at the time of starting the down-shifting according to the vehicle running state; calculating a first expected turbine speed that is a turbine speed at a shift-finish point of the down-shifting according to the vehicle running state; calculating a second expected turbine speed that is a turbine speed at a shift-finish point of the down-shifting requested by the sport mode down-shifting request; determining if a speed difference between the first and second expected turbine speeds is greater than or equal to a predetermined shift prohibition reference value; and prohibiting the requested sport mode down-shifting if the speed difference is greater than or equal to the predetermined shift prohibition reference value.

Preferably, such shift control method may further include, when the down-shifting according to the driving condition is not under operation, controlling down-shifting to a final target speed requested by the sport mode down-shifting request.

Also preferably, the shift control method may further include, when a sport mode down-shifting request is detected while up-shifting according to the driving condition is under operation, controlling down-shifting to a final target speed requested by the sport mode down-shifting request.

The exemplary shift control method may further include, when the speed difference is less than the predetermined shift prohibition reference value, controlling down-shifting to a final target speed requested by the sport mode down-shifting request.

In a further aspect, motor vehicles are provided that comprise a described apparatus.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present apparatus and shift control method will be particularly useful with a wide variety of motor vehicles.

Other aspects of the invention are discussed infra.

DETAILED DESCRIPTION OF THE EMBODIMENTS

Exemplary embodiments of the present invention will hereinafter be described in detail with reference to the accompanying drawings.

Figure 1:
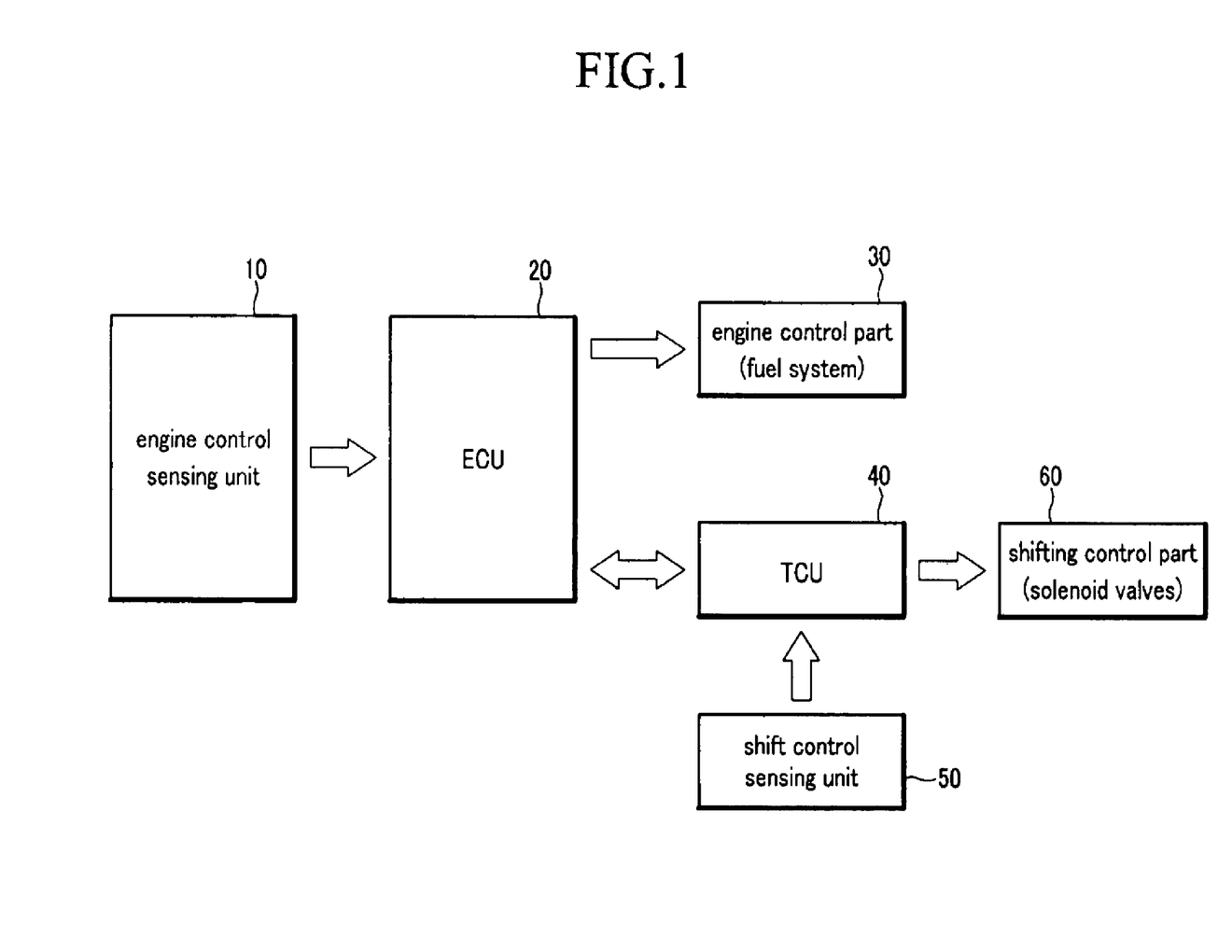
FIG. 1 is a block diagram of a shift control apparatus of an automatic transmission according to an exemplary embodiment of the present invention.

FIG. 1 is a block diagram of a shift control apparatus of an automatic transmission according to an exemplary embodiment of the present invention.

An engine control sensing unit 10 includes a plurality of sensors. The engine control sensing unit 10 detects a variety of information relating to a current running state of a vehicle, and provides the same to an engine control unit (ECU) 20. Based on the data, the ECU 20 controls an engine by controlling the engine control part 30.

At the same time, the ECU 20 provides data required for a shift control to a transmission control unit (TCU) 40 such that the TCU 40 may optimally control the shifting operation of an automatic transmission.

In addition to the data, the TCU 40 receives data from the shift control sensing unit 50 as well. The TCU 40 controls shifting operation of the automatic transmission by controlling a shift control part 60 based on the data received from the shift control sensing unit 50 and/or the ECU 20.

The engine control sensing unit 10 includes various sensors such as an accelerator pedal position sensor, a throttle position sensor, a turbine speed sensor, a vehicle speed sensor, a crank angle sensor, an engine speed sensor, a coolant temperature sensor such that all required information for engine control may be obtained. The shift control sensing unit 50 includes various sensors required for obtaining all required information for shift control of the transmission. For example, the shift control sensing unit 50 includes an input speed sensor sensing an input speed of the transmission, an output speed sensor sensing an output speed of the transmission, an oil temperature sensor, an inhibitor switch that senses a current position of the shift lever, a sport mode "+" operation sensor that senses a movement of the shift lever to a "+" direction (that is, upshift direction) in a sport mode gate, a sport mode "−" operation sensor that senses a movement of the shift lever to a "−" direction (that is, downshift direction) in a sport mode gate, and a brake switch sensing a brake pedal operation.

In addition, the engine control part 30 includes a variety of actuators for controlling the engine. For example, the engine control part 30 includes a fuel system. The shift control part 60 includes a variety of solenoid valves used in hydraulic pressure control of the automatic transmission, and the shift control part 60 enables shifting operation of the automatic transmission by controlling the solenoid valves so as to engage or disengage frictional elements in the automatic transmission.

The communication between the ECU 20 and the TCU 40 may be realized by a controller area network (CAN) or by a serial network.

When a sport mode shifting request by a shift lever is detected during upshifting or downshifting control according to a vehicle's running condition such as vehicle speed and throttle opening, the TCU 40 accepts or rejects the sport mode shifting request depending on an expected turbine speed at a final target shift-speed corresponding to the shifting request, such that a shift feel may be enhanced, an abnormal shift-shock may be prevented, and a better responsiveness may be obtained.

That is, when the sport mode up-shifting request is detected while up-shifting control according to a vehicle running state is under operation, the TCU 40 firstly calculates a target shift-speed turbine speed by the current upshifting according to the vehicle running state and an expected turbine speed at the final target shift-speed corresponding to the sport mode up-shifting request. When the difference between the target-shift-speed turbine speed and the expected turbine speed at the final shift-speed does not exceed a reference value obtained from a map table, the TCU 40 accepts (i.e., performs a corresponding shifting control) the sport mode up-shifting request. On the other hand, when the difference between the two turbine speeds exceed the reference value, the TCU 40 rejects (i.e., does not perform the corresponding shifting control) the sport mode up-shifting request. In other words, when the difference between the two turbine speeds is above the reference value, the shifting control according to the vehicle running state is performed without an interruption.

It is to be noted that the reference values stored in the map table may have values such that the calculated turbine speed difference becomes above the reference value when the sport mode up-shifting request occurs during upshifting control according to the vehicle running state. In this case, the sport mode up-shifting request is rejected.

When a sport mode downshifting request is detected while upshifting control according to the vehicle running state is under operation, the TCU 40 accepts the sport mode down-shifting request and performs the requested downshift.

When a sport mode down-shifting request is detected while upshifting control according to the vehicle running state is under operation, the TCU 40 accepts the sport mode down-shifting request and performs the requested downshift.

That is, when the sport mode down-shifting request is detected during downshifting control according to a vehicle running state, the TCU 40 firstly calculates a target shift-speed turbine speed by the current down-shifting according to the vehicle running state and an expected turbine speed at the final target shift-speed corresponding to the sport mode down-shifting request. Then, the TCU 40 accepts (i.e., performs a corresponding shifting control) the sport mode down-shifting request when the difference between the target-shift-speed turbine speed and the expected turbine speed at the final shift-speed does not exceed a reference value obtained from a map table. On the other hand, the TCU 40 rejects (i.e., does not perform the corresponding shifting control) the sport mode down-shifting request when the turbine speed difference exceed the reference value. In other words, when the turbine speed difference is above the reference value, the shifting control according to the vehicle running state is performed without an interruption.

It is to be noted that the reference values stored in the map table may have values such that the calculated turbine speed difference becomes above the reference value when the sport mode down-shifting request occurs during downshifting control according to the vehicle running state. In this case, the sport mode down-shifting request is rejected.

When a sport mode up-shifting request is detected while downshifting control according to the vehicle running state is under operation, the TCU 40 accepts the sport mode up-shifting request and performs the requested upshift.

In another aspect, the present invention provides a shift control method. Hereinafter, a shift control method according to an exemplary embodiment of the present invention will be described in detail with reference to accompanied drawings.

In a first preferred embodiment, shift control methods of the present invention may accept or reject a sport mode up-shifting request during upshifting control according to the driving condition.

More particularly, while a vehicle equipped with an automatic transmission is running, the ECU 20 receives data from the engine control sensing unit 10 and optimally controls the engine by controlling the engine control part 30 based on the received data.

At the same time, the ECU 20 provides data required for a shift control to a transmission control unit (TCU) 40.

The TCU 40 also receives data from the shift control sensing unit 50 and controls shifting operation of the automatic transmission by controlling the shift control part 60 based on the data received from the shift control sensing unit 50 and from the ECU 20.

Figure 3:
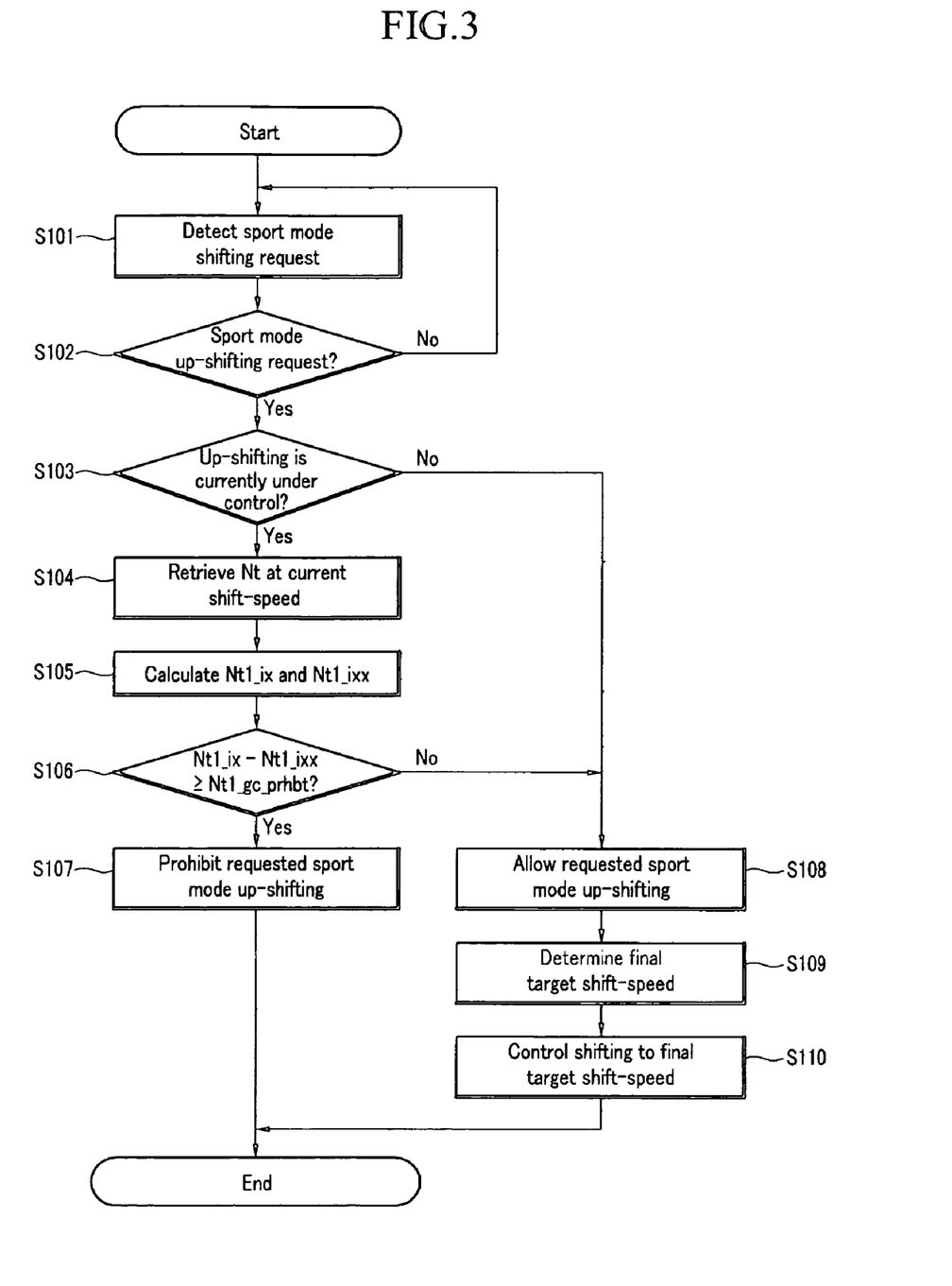
FIG. 3 is a flowchart showing a shift control method of an automatic transmission according to a first exemplary embodiment of the present invention.

While the engine and the transmission is controlled, the TCU 40 receives a sport mode shift signal from the shift control sensing unit 50 at step S101.

When the sport mode shift signal is detected at the step S101, the TCU 40 determines at step S102 whether the detected signal is a sport mode up-shifting request that is produced by the movement of the shift lever to the "+" position in the sport mode gate.

When the detected signal is not the sport mode up-shifting signal, the step S101 is executed. When the detected signal is the sport mode up-shifting signal, the TCU 40 determines at step S103 whether up-shifting according to the vehicle running state is currently under the control (that is, when the shifting stage is in a range [B] in FIG. 2). Here, up-shifting according to the vehicle running state is determined to be currently under the control if the shifting stage is in a range [B] in FIG. 2, that is, between a shift-start point (SS) and a shift-finish (SF) point.

Several terms relating to shifting control is explained below.

Figure 2:
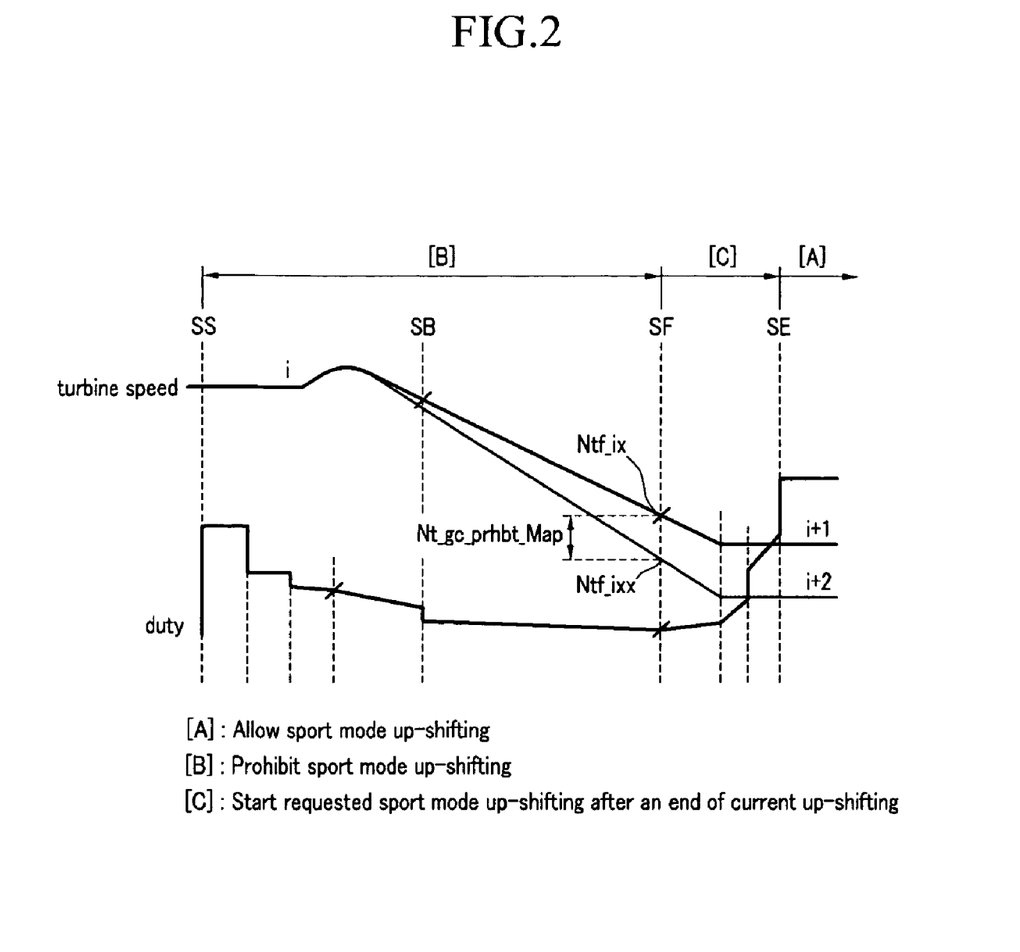
FIG. 2 is a control pattern diagram for a shift control method of an automatic transmission according to a first exemplary embodiment the present invention.

When it is determined that upshift control is required on the basis of vehicle speed and throttle valve opening, the TCU 40 starts upshift control by starting control of a solenoid valve in the AT, which is usually called "shift-start point" (SS point).

By starting of the solenoid valve control, after a certain period, an off-going frictional element begins releasing its hydraulic pressure, and an on-coming element begins to be supplied with a hydraulic pressure, which is usually called "shift-begin point" (SB point). The period after the SS point to the SB point becomes a delay period which is not used for an actual shifting operation of the AT.

So, an actual shifting period (also called an inertia phase) of the AT begins at the SB point and finishes at a time point at which the off-going element is fully disengaged and the on-coming element is fully engaged. Such a time point at which the off-going element is fully disengaged and the on-coming element is fully engaged is usually called "shift-finish point" (SF point).

When up-shifting according to the vehicle running state is currently under the control, a turbine speed Nt_scan with respect to a gear ratio at the time point of the sport mode up-shifting request is retrieved at step S104.

Here, the turbine speed Nt_scan with respect to the gear ratio at the time point of the sport mode up-shifting request implies a turbine speed at the SS point of the up-shifting according to the vehicle running state. Such a turbine speed Nt_scan is stored in TCU 40 and easily retrieved when needed.

Subsequently, at step S105, the TCU 40 calculates a theoretically expected turbine speed $Nt1\_ix$ at the time of SF point of the current up-shifting, and also calculates a theoretically expected turbine speed Nt1_ixx at the time of SF point of the requested sport mode up-shifting to a final target shift-speed. Here, it is to be noted that a plurality of sport mode up-shifting requests may be generated by quickly moving the shift lever to the "+" position in the sport mode gate within a predetermined period, and in this case, the final target shift-speed is determined based on the number of sport mode up-shifting requests.

In other words, the expected turbine speed Nt1_ix is a turbine speed that is expected to be at the time of finishing the current up-shifting according to the vehicle running state, and the expected turbine speed Nt1_ixx is a turbine speed that is expected to be at the time of finishing the requested sport mode up-shifting.

The expected turbine speed Nt1_ix is calculated as a value by an equation "turbine speed (Nt_scan)*G(i+1)/G(i)".

Here, G(i) denotes a gear ratio at a current shift-speed, and G(i+1) denotes a gear ratio of a target shift-speed determined by the up-shifting according to the vehicle running state.

The expected turbine speed Nt1_ixx is calculated as a value by an equation "turbine speed (Nt_scan)*G(i+2)/G(i)".

Here, G(i) denotes the gear ratio at the current shift-speed, and G(i+2) denotes a gear ratio of a final target shift-speed determined by the requested sport mode up-shifting.

At step S106, the TCU 40 calculates a turbine speed difference between the expected turbine speed Nt1_ix according to the vehicle running state and the expected turbine speed Nt1_ixx according to the sport mode up-shifting request, and determines whether the calculated speed difference is greater than or equal to a predetermined shift prohibition reference value Nt1_gc_prhbt stored in the TCU 40 as map table data.

When the calculated speed difference is greater than or equal to the predetermined shift prohibition reference value Nt1_gc_prhbt, the sport mode up-shifting request (that is, an upshift shifting request by moving the shift lever to the "+" position of the sport mode gate) is rejected and the requested sport mode up-shifting is prohibited at step S107.

If the up-shifting according to the vehicle running state is not under the control at the step S103, it may be determined that the shifting stage is in either [A] range or [C] range. In this case, the sport mode up-shifting request is accepted and the requested sport mode up-shifting is allowed at step S108. Also, if the speed difference is below the predetermined shift prohibition reference value Nt1_gc_prhbt at the step S106, the sport mode up-shifting request is accepted and the requested sport mode up-shifting is allowed at step S108.

Therefore, the final target shift-speed according to the requested sport mode up-shifting is determined at step S109, and subsequently, the TCU 40 controls the shifting operation of the automatic transmission to the final target shift-speed at step S110.

As described above, when a plurality of sport mode up-shifting requests are generated, the final target shift-speed can be determined based on the number of sport mode up-shifting requests.

For example, a map table data for calculating the expected turbine speeds Nt1_ix and Nt1_ixx can be set as shown in table 1.

TABLE 1

|  | 1st | 2nd | 3rd | 4th | 5th |
|---|---|---|---|---|---|
| Gear Ratio (i) | 3.827 | 2.368 | 1.520 | 1.000 | 0.834 |
| Nt (=1000) | 1000 | 619 | 397 | 261 | 218 |
| Nt (=1500) | 1500 | 928 | 596 | 392 | 327 |
| Nt (=2000) | 2000 | 1238 | 794 | 523 | 436 |
| Nt (=2500) | 2500 | 1547 | 993 | 653 | 545 |
| Nt (=3000) | 3000 | 1856 | 1192 | 784 | 654 |
| Nt (=3500) | 3500 | 2166 | 1390 | 915 | 763 |
| Nt (=4000) | 4000 | 2475 | 1589 | 1045 | 872 |
| Nt (=4500) | 4500 | 2784 | 1787 | 1176 | 981 |
| Nt (=5000) | 5000 | 3094 | 1986 | 1307 | 1090 |
| Nt (=5500) | 5500 | 3403 | 2184 | 1437 | 1199 |
| Nt (=6000) | 6000 | 3713 | 2383 | 1568 | 1308 |

In addition, an exemplary map table data of the predetermined shift prohibition reference value Nt1_gc_prhbt for determining allowance and prohibition of the requested sport mode up-shifting based on the turbine speed can be set as shown in table 2.

TABLE 2

| Nt1_gc_prhbt | Nt1_gc_prhbt13<br>1→2⇒3 | Nt1_gc_prhbt24<br>2→3⇒4 | Nt1_gc_prhbt35<br>3→4⇒5 |
|---|---|---|---|
| Nt (=1000) | 222 | 136 | 43 |
| Nt (=1500) | 332 | 204 | 65 |
| Nt (=2000) | 443 | 272 | 87 |
| Nt (=2500) | 554 | 340 | 108 |
| Nt (=3000) | 665 | 408 | 130 |
| Nt (=3500) | 776 | 476 | 152 |
| Nt (=4000) | 886 | 544 | 174 |
| Nt (=4500) | 997 | 611 | 195 |
| Nt (=5000) | 1108 | 679 | 217 |
| Nt (=5500) | 1219 | 747 | 239 |
| Nt (=6000) | 1330 | 815 | 260 |

Allowance or prohibition of the sport mode up-shifting that is requested during upshifting control according to the vehicle running state is described with reference to the exemplary map table data of Tables 1 and 2.

For example, if a sport mode up-shifting request is detected during upshifting control from the first shift-speed to the second shift-speed that was started when the turbine speed Nt is 1,000 rpm, the TCU 40 retrieves the turbine speed Nt (=1,000 rpm).

Then, the TCU 40 calculates the expected turbine speed Nt1_ix (here, Ntf2=619 rpm) that is theoretically expected to be at the time of SF point of the current up-shifting to the second shift-speed (which is a target speed of the up-shifting according to the vehicle running state). Also, the TCU 40 calculates the expected turbine speed Nt1_ixx (here, Ntf3=397 rpm) that is theoretically expected to be at the time of SF point of the requested sport mode up-shifting to a final target shift-speed, that is, the third shift-speed.

Subsequently, the turbine speed difference 222 rpm (which is obtained from "Ntf2−Ntf3") is compared with the value 222 rpm of Nt1_gc_prhbt13 at the turbine speed Nt of 1,000 rpm, and it is determined whether the relationship "Ntf2−Ntf3≧Nt1_gc_prhbt13" is satisfied.

Since it is satisfied that the turbine speed difference (222 rpm)≧shift prohibition reference value (Nt1_gc_prhbt13=222 rpm), the sport mode up-shifting to the third shift-speed that is requested during the up-shifting from the first shift-speed to the second shift-speed according to the vehicle running state is prohibited.

In the first embodiment, a sport mode up-shifting request during downshifting control according to the vehicle running state is handled by the TCU 40 as follows.

When a sport mode up-shifting request is detected during downshifting control according to the vehicle running state (that is, when the shift lever is operated to the "+" position in the sport mode gate during the downshifting), such a sport mode up-shifting is allowed and enabled by the TCU 40.

For example, when a sport mode up-shifting request is detected while down-shifting control from the fifth shift-speed to the third shift-speed is under operation, the TCU 40 controls the transmission to enable the current shift-speed (i.e., the fifth shift-speed).

In a second embodiment, shift control methods of the present invention may accept or reject a sport mode down-shifting request during downshifting control according to the driving condition.

While a vehicle equipped with an automatic transmission is running, the ECU 20 receives data from the engine control sensing unit 10 and optimally controls the engine by controlling the engine control part 30 based on the received data.

At the same time, the ECU 20 provides data required for a shift control to a transmission control unit (TCU) 40.

The TCU 40 also receives data from the shift control sensing unit 50 and controls shifting operation of the automatic transmission by controlling the shift control part 60 based on the data received from the shift control sensing unit 50 and data from the ECU 20.

Figure 5:
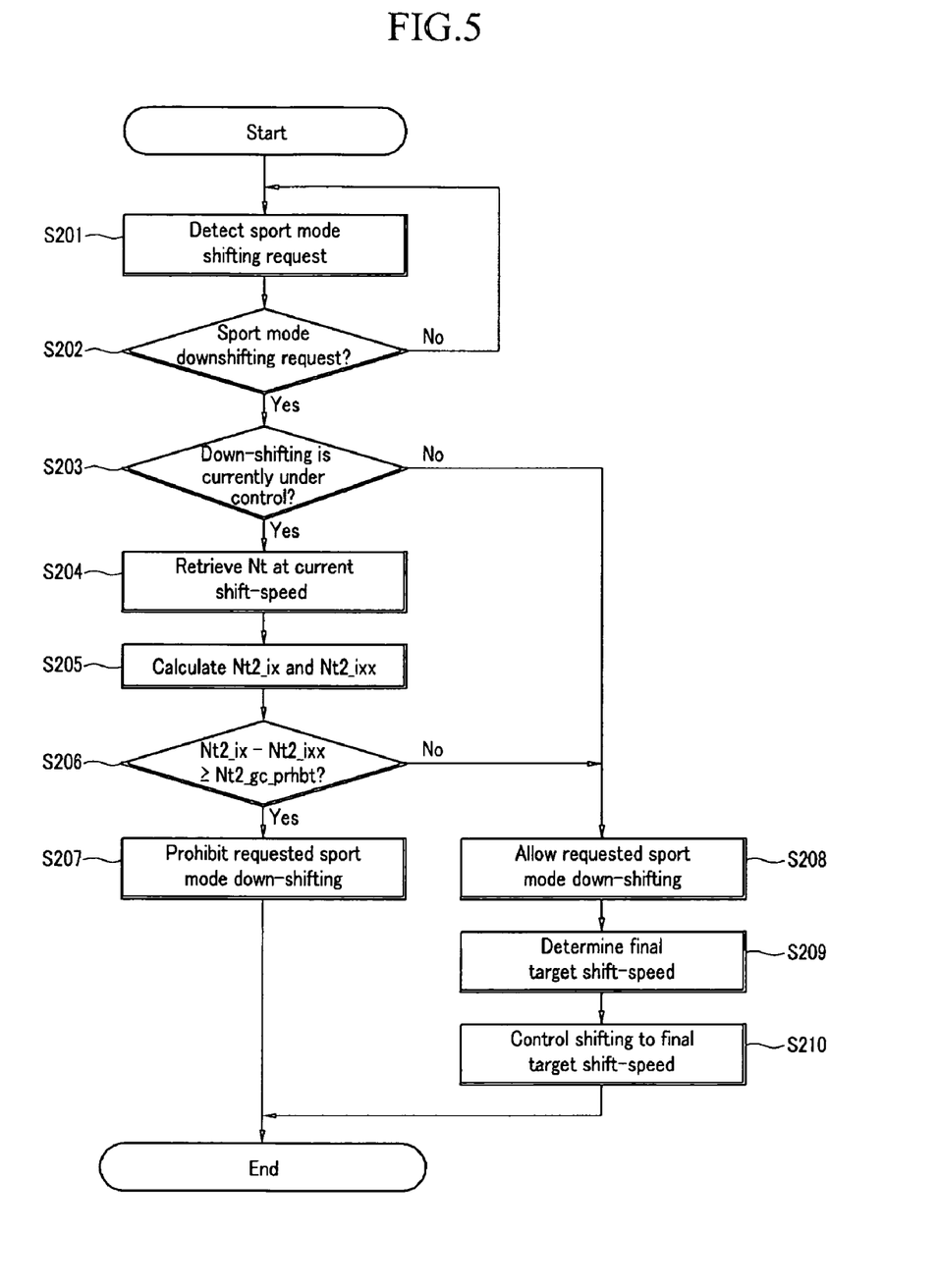
FIG. 5 is a flowchart showing a shift control method of an automatic transmission according to a second exemplary embodiment of the present invention.

While the engine and the transmission is controlled, the TCU 40 receives a sport mode shift signal from the shift control sensing unit 50 at step S201.

When the sport mode shift signal is detected at the step S201, the TCU 40 determines at step S202 whether the detected signal is a sport mode down-shifting request that is produced by moving the shift lever to the "−" position in the sport mode gate.

When the detected signal is not the sport mode down-shifting signal, the step S201 is executed. When the detected signal is not the sport mode down-shifting signal, the TCU 40 determines at step S203 whether a down-shifting according to the vehicle running state is currently under the control (that is, when the shifting stage is in a range [B] in FIG. 4). Here, the down-shifting according to the vehicle running state is determined to be currently under the control if the shifting stage is in a range [B] in FIG. 4, that is, between SS and SF points.

When the down-shifting according to the vehicle running state is currently under the control, a turbine speed Nt_scan with respect to a gear ratio at the time point of the sport mode down-shifting request is retrieved at step S204.

Subsequently, at step S205, the TCU 40 calculates a theoretically expected turbine speed Nt1_ix at the time of SF point of the current down-shifting, and also calculates a theoretically expected turbine speed Nt1_ixx at the time of SF point of the requested sport mode down-shifting to a final target shift-speed.

Here, the turbine speed Nt_scan with respect to the gear ratio at the time point of the sport mode down-shifting request implies a turbine speed at the SS point of the down-shifting according to the vehicle running state. Such a turbine speed Nt_scan is stored in TCU 40 and easily retrieved when needed.

That is, the expected turbine speed Nt2_ix is a turbine speed that is expected to be at the time of finishing the current down-shifting according to the vehicle running state, and the expected turbine speed Nt2_ixx is a turbine speed that is expected to be at the time of finishing the requested sport mode down-shifting.

The expected turbine speed Nt2_ixx is calculated as a value by an equation "turbine speed (Nt_scan)*G(i−1)/G(i)".

Here, G(i) denotes a gear ratio at a current shift-speed, and G(i−1) denotes a gear ratio of a target shift-speed determined by the down-shifting according to the vehicle running state.

The expected turbine speed Nt2_ixx is calculated as a value by an equation "turbine speed (Nt_scan)*G(i−2)/G(i)".

Here, G(i) denotes the gear ratio at the current shift-speed, and G(i−2) denotes a gear ratio of a final target shift-speed determined by the requested sport mode down-shifting.

At step S206, the TCU 40 calculates a turbine speed difference between the expected turbine speed Nt2_ix according to the vehicle running state and the expected turbine speed Nt2_ixx according to the sport mode down-shifting request, and determines whether the calculated speed difference is greater than or equal to a predetermined shift prohibition reference value Nt2_gc_prhbt stored in the TCU 40 as map table data.

When the calculated speed difference is greater than or equal to the predetermined shift prohibition reference value Nt2_gc_prhbt, the sport mode down-shifting request (that is, a downshift shifting request by moving the shift lever to the "−" position of the sport mode gate) is rejected and the requested sport mode down-shifting is prohibited at step S207.

Figure 4:
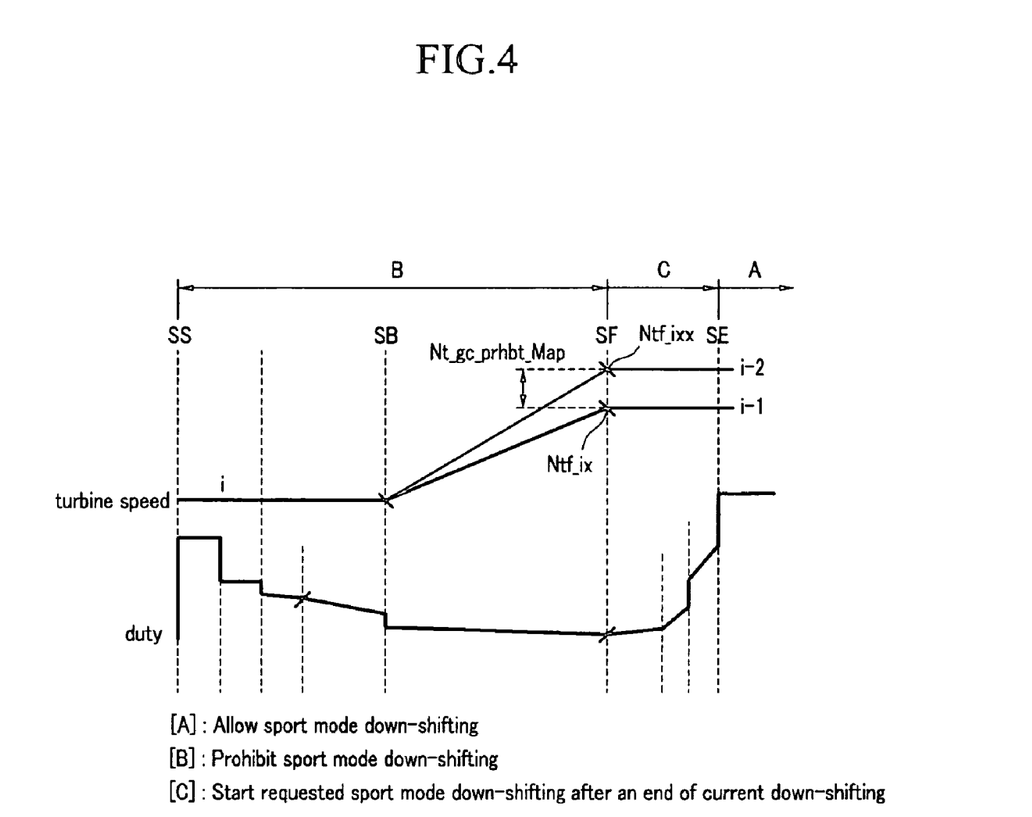
FIG. 4 is a control pattern diagram for a shift control method of an automatic transmission according to a second exemplary embodiment the present invention.

If the down-shifting according to the vehicle running state is not under the control at the step S203, it may be determined that the shifting stage is in either [A] range or [C] range. In this case, the sport mode down-shifting request is accepted and the requested sport mode down-shifting is allowed at step S208. Also, if the speed difference is below the predetermined shift prohibition reference value Nt2_gc_prhbt at the step S206, the sport mode down-shifting request is accepted and the requested sport mode down-shifting is allowed at step S208.

Therefore, the final target shift-speed according to the requested sport mode down-shifting is determined at step S209, and subsequently, the TCU 40 controls the shifting operation of the automatic transmission to the final target shift-speed at step S210. Here, as described above, when a plurality of sport mode down-shifting requests were generated, the final target shift-speed is determined based on the number of sport mode down-shifting requests.

For example, a map table data for calculating the expected turbine speeds Nt2_ix and Nt2_ixx can be set as shown in table 3.

TABLE 3

|  | 5th | 4th | 3rd | 2nd | 1st |
|---|---|---|---|---|---|
| Gear Ratio (i) | 0.834 | 1.000 | 1.520 | 2.368 | 3.827 |
| Nt (=1000) | 1000 | 1199 | 1823 | 2839 | 4589 |
| Nt (=1500) | 1500 | 1799 | 2734 | 4259 | 6883 |
| Nt (=2000) | 2000 | 2398 | 3645 | 5679 | 9177 |
| Nt (=2500) | 2500 | 2998 | 4556 | 7098 | 11472 |
| Nt (=3000) | 3000 | 3597 | 5468 | 8518 | 13766 |
| Nt (=3500) | 3500 | 4197 | 6379 | 9938 | 16061 |
| Nt (=4000) | 4000 | 4796 | 7290 | 11357 | 18355 |
| Nt (=4500) | 4500 | 5396 | 8201 | 12777 | 20649 |
| Nt (=5000) | 5000 | 5995 | 9113 | 14197 | 22944 |
| Nt (=5500) | 5500 | 6595 | 10024 | 15616 | 25238 |
| Nt (=6000) | 6000 | 7194 | 10935 | 17036 | 27532 |

In addition, an exemplary map table data of the predetermined shift prohibition reference value Nt2_gc_prhbt for determining allowance and prohibition of the requested sport mode down-shifting based on the turbine speed can be set as shown in table 4.

TABLE 4

|  | Nt2_gc_prhbt53 | Nt2_gc_prhbt42 | Nt2_gc_prhbt31 |
|---|---|---|---|
| Nt2_gc_prhbt | 5→4⇒3 | 4→3⇒2 | 3→2⇒1 |
| Nt (=1000) | 624 | 1017 | 1749 |
| Nt (=1500) | 935 | 1525 | 2624 |
| Nt (=2000) | 1247 | 2034 | 3499 |
| Nt (=2500) | 1559 | 2542 | 4374 |
| Nt (=3000) | 1871 | 3050 | 5248 |
| Nt (=3500) | 2182 | 3559 | 6123 |
| Nt (=4000) | 2494 | 4067 | 6998 |
| Nt (=4500) | 2806 | 4576 | 7872 |
| Nt (=5000) | 3118 | 5084 | 8747 |
| Nt (=5500) | 3429 | 5592 | 9622 |
| Nt (=6000) | 3741 | 6101 | 10496 |

Allowance or prohibition of the sport mode down-shifting that is requested during downshifting control according to the vehicle running state is described with reference to the exemplary map table data of Tables 3 and 4.

For example, if a sport mode down-shifting request is detected during downshifting from the fifth shift-speed to the fourth shift-speed that was started when the turbine speed Nt is 1,000 rpm, the TCU 40 retrieves the turbine speed Nt (=1,000 rpm).

Then, the TCU 40 calculates the expected turbine speed Nt2_ix (here, Ntf4=1,199 rpm) that is theoretically expected to be at the time of SF point of the current down-shifting to the fourth shift-speed (which is a target speed of the down-shifting according to the vehicle running state). Also, the TCU 40 calculates the expected turbine speed Nt2_ixx (here, Ntf3=1,823 rpm) that is theoretically expected to be at the time of SF point of the requested sport mode down-shifting to a final target shift-speed, that is, the third shift-speed.

Subsequently, the turbine speed difference 624 rpm (which is obtained from "Ntf3−Ntf4") is compared with the value 624 rpm of Nt2_gc_prhbt53 at the turbine speed Nt of 1,000 rpm, and it is determined whether the relationship "Ntf3−Ntf4≧Nt2_gc_prhbt53" is satisfied.

Since it is satisfied that the turbine speed difference (624 rpm)≧shift prohibition reference value (Nt2_gc_prhbt53=624 rpm), the sport mode down-shifting to the third shift-speed that is requested during the down-shifting from the fifth shift-speed to the fourth shift-speed according to the vehicle running state is prohibited.

In the second embodiment, a sport mode down-shifting request during up-shifting control according to the vehicle running state is handled by the TCU 40 as follows.

When a sport mode down-shifting request is detected during upshifting control according to the vehicle running state (that is, when the shift lever is operated to the "−" position in the sport mode gate during the up-shifting), such a sport mode down-shifting is allowed and enabled by the TCU 40.

For example, when a sport mode down-shifting request is detected while up-shifting control from the third shift-speed to the fourth shift-speed is under operation, the TCU 40 controls the transmission to enable the current shift-speed (i.e., the third shift-speed).

As described above, according to an exemplary embodiment of the present invention, when a sport mode up-shifting or down-shifting request is detected during up-shifting or down-shifting control according to the vehicle running state, allowance or prohibition of the requested up-shifting or down-shifting is controlled on the basis of turbine speed expected at a final target speed requested by the sport mode shifting request. Accordingly, responsiveness in acceleration is improved and shift-shock is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission, comprising:
    determining whether a sport mode upshifting request is detected;
    determining, when the sport mode upshifting request is detected, whether upshifting according to a vehicle running condition is under operation;
    retrieving, when the upshifting according to a vehicle running condition is under operation, an initial turbine speed at the time of starting the upshifting according to the vehicle running state;
    calculating a first expected turbine speed that is a turbine speed at a shift-finish point of the upshifting according to the vehicle running state;
    calculating a second expected turbine speed that is a turbine speed at a shift-finish point of the upshifting requested by the sport mode upshifting request;
    determining if a speed difference between the first and second expected turbine speeds is greater than or equal to a predetermined shift prohibition reference value; and
    prohibiting the requested sport mode up-shifting if the speed difference is greater than or equal to the predetermined shift prohibition reference value.

2. The shift control method of claim 1, further comprising, when the upshifting according to the driving condition is not under operation, controlling upshifting to a final target speed requested by the sport mode upshifting request.

3. The shift control method of claim 1, further comprising, when a sport mode upshifting request is detected while downshifting according to the driving condition is under operation, controlling upshifting to a final target speed requested by the sport mode upshifting request.

4. The shift control method of claim 1, further comprising, when the speed difference is less than the predetermined shift prohibition reference value, controlling upshifting to a final target speed requested by the sport mode upshifting request.

5. The shift control method of claim 1, further comprising:
    controlling upshifting to a final target speed requested by the sport mode upshifting request, when the upshifting according to the driving condition is not under operation;
    controlling upshifting to a final target speed requested by the sport mode upshifting request, when a sport mode upshifting request is detected while a downshifting according to the driving condition is under operation; and
    controlling upshifting to a final target speed requested by the sport mode upshifting request, when the speed difference is less than the predetermined shift prohibition reference value.

6. A shift control method of an automatic transmission, comprising:
- determining whether a sport mode downshifting request is detected;
- determining, when the sport mode downshifting request is detected, whether downshifting according to a vehicle running condition is under operation;
- retrieving, when the downshifting is under operation, an initial turbine speed at the time of starting the downshifting according to the vehicle running state;
- calculating a first expected turbine speed that is a turbine speed at a shift-finish point of the down-shifting according to the vehicle running state;
- calculating a second expected turbine speed that is a turbine speed at a shift-finish point of the downshifting requested by the sport mode downshifting request;
- determining if a speed difference between the first and second expected turbine speeds is greater than or equal to a predetermined shift prohibition reference value; and
- prohibiting the requested sport mode down-shifting if the speed difference is greater than or equal to the predetermined shift prohibition reference value.

7. The shift control method of claim 6, further comprising, when the downshifting according to the driving condition is not under operation, controlling downshifting to a final target speed requested by the sport mode downshifting request.

8. The shift control method of claim 6, further comprising, when a sport mode downshifting request is detected while upshifting according to the driving condition is under operation, controlling downshifting to a final target speed requested by the sport mode downshifting request.

9. The shift control method of claim 6, further comprising, when the speed difference is less than the predetermined shift prohibition reference value, controlling downshifting to a final target speed requested by the sport mode downshifting request.

10. The shift control method of claim 6, wherein:
- controlling downshifting to a final target speed requested by the sport mode downshifting request, when the downshifting according to the driving condition is not under operation;
- controlling downshifting to a final target speed requested by the sport mode downshifting request, when a sport mode downshifting request is detected while upshifting according to the driving condition is under operation; and
- controlling downshifting to a final target speed requested by the sport mode downshifting request, when the speed difference is less than the predetermined shift prohibition reference value.

11. A shift control apparatus of an automatic transmission, comprising:
- a sensor unit that detects data for shift control of the automatic transmission;
- an actuating unit for actuating shifting of the automatic transmission; and
- a transmission control unit that controls the shifting of the automatic transmission by controlling the actuating unit based on the data from the sensor unit,
- wherein the transmission control unit executes a set of instructions comprising:
- determining whether a sport mode upshifting request is detected;
- determining, when the sport mode upshifting request is detected, whether upshifting according to a vehicle running condition is under operation;
- retrieving, when the upshifting is under operation, an initial turbine speed at the time of starting the upshifting according to the vehicle running state;
- calculating a first expected turbine speed that is a turbine speed at a shift-finish point of the upshifting according to the vehicle running state;
- calculating a second expected turbine speed that is a turbine speed at a shift-finish point of the upshifting requested by the sport mode upshifting request;
- determining if a speed difference between the first and second expected turbine speeds is greater than or equal to a predetermined shift prohibition reference value; and
- prohibiting the requested sport mode upshifting if the speed difference is greater than or equal to the predetermined shift prohibition reference value.

12. The shift control apparatus of claim 11, wherein the set of instructions further comprises, when the upshifting according to the driving condition is not under operation, controlling an upshifting to a final target speed requested by the sport mode upshifting request.

13. The shift control apparatus of claim 11, wherein the set of instructions further comprises, when a sport mode upshifting request is detected while downshifting according to the driving condition is under operation, controlling upshifting to a final target speed requested by the sport mode upshifting request.

14. The shift control apparatus of claim 11, wherein the set of instructions further comprises, when the speed difference is less than the predetermined shift prohibition reference value, controlling upshifting to a final target speed requested by the sport mode upshifting request.

15. The shift control apparatus of claim 11, wherein the set of instructions further comprises instructions for:
- controlling upshifting to a final target speed requested by the sport mode upshifting request, when the upshifting according to the driving condition is not under operation;
- controlling upshift to a final target speed requested by the sport mode upshifting request, when a sport mode upshifting request is detected while downshifting according to the driving condition is under operation; and
- controlling upshifting to a final target speed requested by the sport mode upshifting request, when the speed difference is less than the predetermined shift prohibition reference value.

16. A shift control apparatus of an automatic transmission, comprising:
- a sensor unit that detects data for shift control of the automatic transmission;
- an actuating unit for actuating shifting of the automatic transmission; and
- a transmission control unit that controls the shifting of the automatic transmission by controlling the actuating unit based on the data from the sensor unit,
- wherein the transmission control unit executes a set of instructions comprising:
- determining whether a sport mode downshifting request is detected;
- determining, when the sport mode downshifting request is detected, whether downshifting according to a vehicle running condition is under operation;

retrieving, when the downshifting according to a vehicle running condition is under operation, an initial turbine speed at the time of starting the downshifting according to the vehicle running state;

calculating a first expected turbine speed that is a turbine speed at a shift-finish point of the downshifting according to the vehicle running state;

calculating a second expected turbine speed that is a turbine speed at a shift-finish point of the downshifting requested by the sport mode downshifting request;

determining if a speed difference between the first and second expected turbine speeds is greater than or equal to a predetermined shift prohibition reference value; and prohibiting the requested sport mode downshifting if the speed difference is greater than or equal to the predetermined shift prohibition reference value.

17. The shift control apparatus of claim 16, wherein the set of instructions further comprises, when the downshifting according to the driving condition is not under operation, controlling downshifting to a final target speed requested by the sport mode downshifting request.

18. The shift control apparatus of claim 16, wherein the set of instructions further comprises, when a sport mode downshifting request is detected while upshifting according to the driving condition is under operation, controlling downshifting to a final target speed requested by the sport mode downshifting request.

19. The shift control apparatus of claim 16, wherein the set of instructions further comprises, when the speed difference is less than the predetermined shift prohibition reference value, controlling downshifting to a final target speed requested by the sport mode downshifting request.

20. The shift control apparatus of claim 16, wherein the set of instructions further comprises:

controlling downshift to a final target speed requested by the sport mode downshifting request, when the downshifting according to the driving condition is not under operation;

controlling downshifting to a final target speed requested by the sport mode downshifting request, when a sport mode downshifting request is detected while upshifting according to the driving condition is under operation; and controlling downshift to a final target speed requested by the sport mode downshifting request, when the speed difference is less than the predetermined shift prohibition reference value.

* * * * *